Patented Aug. 14, 1951

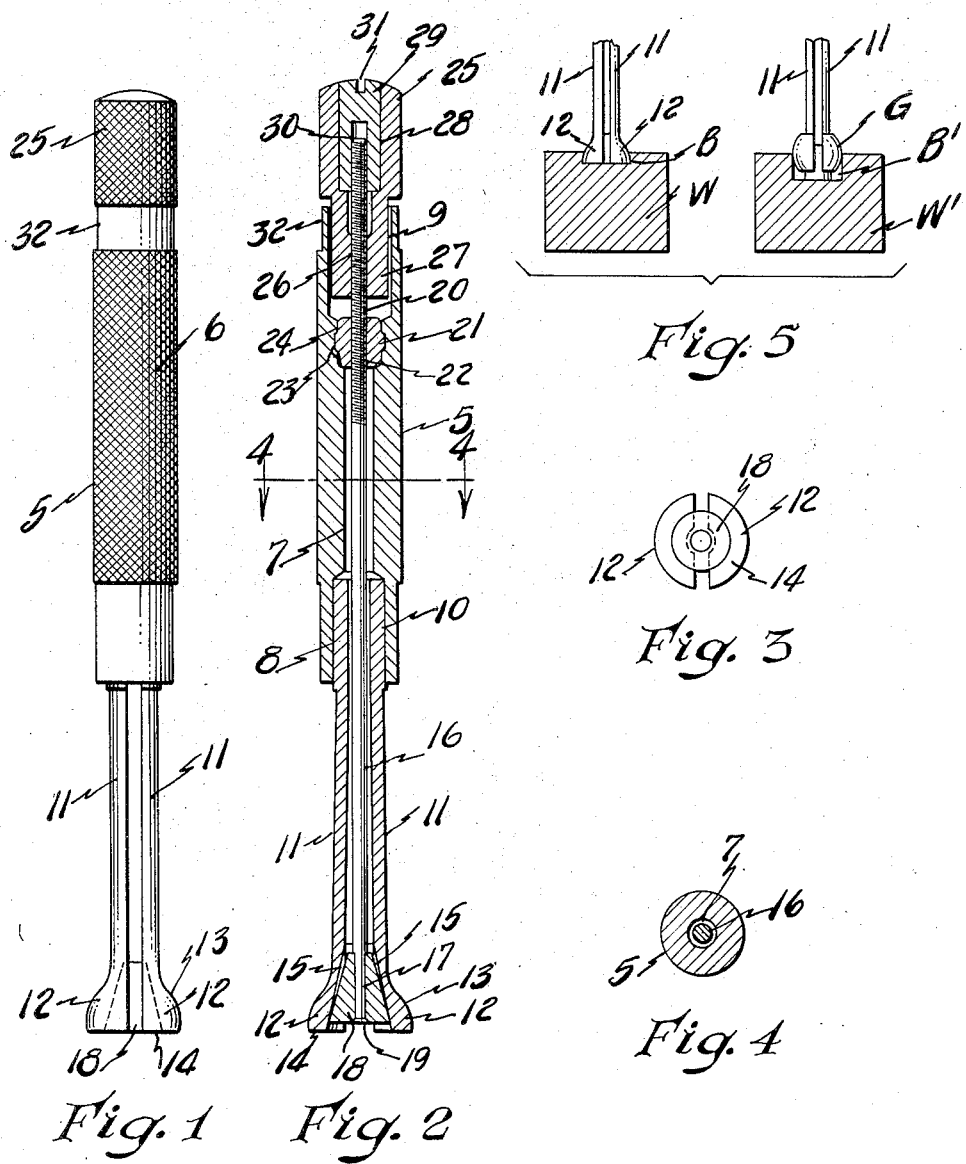

2,563,984

UNITED STATES PATENT OFFICE 2,563,984

ADJUSTABLE PLUG GAUGE

Eugene J. Witchger, Saginaw, Mich., assignor to The Lufkin Rule Company, Saginaw, Mich.

Application November 29, 1947, Serial No. 788,778

2 Claims. (Cl. 33—178)

The present invention relates to improvements in an adjustable plug gauge, and more particularly to a variable bore gauge for measuring and checking relatively small bore holes or openings.

The primary object of the invention resides in the provision of a contact head of such shape and dimensions as to enable the measurement and checking of bore holes throughout the entire depth from the bottom of the hole or opening to the top thereof.

Another object of the invention is to provide a variable bore gauge which is capable of quick adjustment for determining and measuring the inner diameter of relatively small bored holes and openings without necessitating the use of a set of plug gauges of fixed dimensions.

Another object of the invention is to provide a variable bore gauge having a contact head formed of sector-shaped jaw portions which are arranged to permit the checking and measuring of relatively shallow bored holes or openings at different locations with respect to the depth of the hole or opening from the bottom of said hole to a point adjacent the top.

Another object of the invention is to provide a variable bore gauge having a hemispherical shaped head formed of segment jaw portions with the axes extending along the flat side of the head normal to the longitudinal axis of the gauge so that said head will seat within an opening with the flat side of the hemispherical head parallel with the bottom wall of a bored hole or opening.

Another object of the invention is to provide an adjustable gauge which can be easily and quickly set for the checking of bored openings or holes throughout their entire depth.

Another object of the invention is to provide an adjustable gauge for accurately measuring and checking the inner diameter of bored holes or openings and to provide means to facilitate the adjustment or resetting of the gauge when the contact head jaw surfaces have become worn.

Another object of the invention is to provide an adjustable gauge for accurately measuring and checking the inner diameter of bored holes or openings having relatively small diameters of a very shallow depth.

Other objects and advantages of the invention will become apparent during the course of the following description of the accompanying drawings wherein:

Figure 1 is a side-elevational view of the adjustable gauge embodying the invention.

Figure 2 is a longitudinal cross-sectional view of the gauge, showing the various features and details of construction of the different parts of the invention.

Figure 3 is a bottom plan view of the gauge, showing the contact head and the movable contact jaws disposed diametrically opposite the jaw actuating cone.

Figure 4 is a transverse, cross-sectional view taken on the line 4—4 of Figure 2 and looking in the direction of the arrows to illustrate the adjusting rod extending through a longitudinal bore in the gauge handle.

Figure 5 is a diagrammatic view showing the difference between the contact heads of the invention, (left hand side of figure) and the prior art devices, (right hand side of figure), by comparison.

In the drawings, for the purpose of illustration, there is shown a gauge embodying the invention, and said gauge includes a tubular handle 5 having an exteriorly knurled handle grip portion 6. The handle 5 is provided with a center bore 7, terminating at each end in enlarged bores 8 and 9 respectively.

Fitted within the bore 8 is a bushing 10, said bushing having a snug fit with the bore to retain it against displacement. Extending axially from the bushing is a pair of diametrically opposed yieldable arms 11 which are formed integral with the bushing 10 and arranged so that their free ends will move in diametric opposed relation.

Formed on the free end of each yieldable arm 11 is a segment shaped contact jaw 12 having a curved contour 13 on one portion thereof, and a flat surface 14 on another portion thereof. The jaw segments are so shaped that when in a retracted position they form approximately a hemispherical contact head with the flat surface 14 normal to the longitudinal axis of the gauge handle 5.

Each of the segment shaped contact jaws 12 is formed with a conical recess 15 providing opposed wedge surfaces, the included angle between which is approximately 24 degrees.

Extending centrally through the handle 5 is an operating rod 16 having one end turned as at 17 for reception in a correspondingly shaped opening in an actuator cone 18. The lower end of the rod 16 is anchored in the cone 18 by spinning or upsetting the rod end as at 19. Hence, the cone is affixed to the rod so that it will rotate when the rod is rotated, or it may be free to turn on the rod 16.

The actuator cone 18 is of frusto-conical shape with the included angle of the sides depending on the size of the gauge. Normally, the included angle of the frusto-conical actuator 18 is greater than the included angle of the conical recess 15; thus, when the actuator cone is in position, (contacted), as shown in Figure 2, only the lower edge of the cone is in contactual engagement with the conical recess walls 15. However, when the actuator cone is moved in a direction to expand the contact head and jaws 12, the angle of the conical recess surfaces approaches the angle of the cone. This construction provides for greater accuracy within the limits of the gauge, and prevents incorrect inner diameter readings when checking or measuring the inner diameter of small work pieces.

From an inspection of Figure 2, it will be seen that the opposite end of the rod 16 is threaded as at 20 and extends through and is supported by a fixed nut 21, having a central opening 22 correspondingly threaded to permit feeding movement of the operating rod 16 and frusto-conical actuator 18.

The fitted nut 21 is anchored in the central bore of the handle by upsetting or spinning the metal adjacent the nut. The construction shown provides an enlarged recess 23 of irregular shape which may be square in section to prevent turning of the nut. Also, the recess is illustrated as being upset as at 24 to overlie the top of the nut and securely anchor the same in place.

The upper threaded end of the actuator rod 16 projects a slight distance beyond the upper end of the handle 5 and is provided with a knurled fingerpiece 25 having an extension 27 provided with a threaded bore 26, the threads of which correspond to the threads of the actuator rod 16. The construction is such as to allow telescoping movement of the extension 27 within the enlarged portion 9 of the central bore 7.

Also formed in the knurled fingerpiece 25 is an enlarged bore 28 into which the threaded end of the actuator rod 16 projects, and is provided with a locking jam nut 29 having a central threaded opening 30 of the same pitch as the threads on the actuator rod.

A kerf 31 is cut in the closed end of the jam nut 29 to permit ready turning thereof when re-setting the jaws of the contact head.

In Figure 5 (left hand side of the figure), is shown the manner in which the gauge is used when measuring the inner diameter of a bore B in a work piece W. It will be seen that the lower ends of the jaws 12 have their flat bottom sides 14 resting on the floor or bottom of the bore B; hence, an accurate measurement of the bore B can be obtained throughout the entire depth of the bore. As illustrated, the bore B in the work piece W is of a depth of 3/64 of an inch, and the bore is accurately checked by simply inserting the gauge head in the opening of the bore.

In the prior art device shown in the right hand portion of Figure 5, the gauge head G is spherical, and the largest diameter is substantially in alignment with the top of a bore hole B′ in a work piece W′. While the bore hole B′ is considerably deeper than the bore hole B, being 3/16 of an inch in depth, the gauge cannot be used for checking the diameter of the bore hole B′ except possibly in the upper portion thereof.

By contrast, it will be seen that the base of the actuator cone 18 is normally positioned above the flat bottom surfaces 14 of the contact jaws 12. Hence, the cone is disposed slightly above the lower flat bottom surfaces 14 to enable the gauge to be inserted full depth distances within shallow bore holes or openings.

In checking bored holes or openings of small diameter ranging from .360 to .500 of an inch, the gauge is grasped in the user's hand and the jars are adjusted with the other hand by manipulating the knurled fingerpiece 25, so that the jaws will be expanded or set in accordance with the predetermined diameter to be measured or checked.

The contact jaws 13 may be set to various diameters by the aid of a standard micrometer, or by expanding the gauge to fit the hole and then using a micrometer to measure the gauge.

After the jaws have been set to check or measure the predetermined diameter, the gauge head is inserted in the bore opening of the work piece W as shown in the left hand side of Figure 5, with the flat portion of the head practically seating on the bottom of the bore B. By then moving the gauge longitudinally within the bore B, the machinist will feel or sense by frictional contact of the gauge head and will be able to determine the accuracy of the bore B in the work piece W.

Frequently, bore holes in work pieces are larger at one end of the bore than the other, particularly when using a hand drill or a drill which is out of alignment. The advantage of the present invention resides in the advantage afforded the machinist in measuring the diameter of the bore hole throughout its entire depth, or from the bottom to the top.

It is to be further noted that extreme accuracy can be attained with the gauge of the present invention by reason of the fact that the complementary cone faces of the jaws and wedge provide a more stable structure in their expanded position, due to the fact that a greater surface area of the wedge is in contact with the cone-shaped recesses when the jaws are expanded.

In measuring and checking bored holes or openings of smaller diameter, considerable inaccuracies arise with so-called ball gauges of the type indicated diagrammatically in Figure 5 (right hand side of the figure), by reason of the fact that the complementary cone faces of the parts do not engage fully throughout their entire area for all adjustments. By providing the conical recess 15 and actuator 18 with tapered surfaces having different included angles as above pointed out, extreme accuracy is obtained due to the fact that the included angle of the conical recess 15 increases when the jaws are extended, and thus said included angle approaches the included angle of the walls of the cone actuator 18 up to a point where the jaws have been separated a distance greater than the diameter limits of the gauge.

When it is desired to re-set the contact jaws 12 of the gauge head after the contact surfaces have become worn through continued use, the jam nut 29 is loosened to permit angular displacement of the knurled fingerpiece 25 on the threaded upper end of the actuator rod 16.

It is to be understood that the form of the invention herewith shown and described is to be taken as a preferred embodiment thereof, and that various changes in the shape, size, and arrangement of parts may be resorted to without departing from the spirit of the invention, or the scope of the subjoined claims.

What I claim is:

1. In a gauge for measuring and checking the diameter of small bore holes, a tubular handle, a bushing mounted in one end of the handle, longitudinally extending parallel spaced arms formed on the bushing, a contact jaw formed on the free end of each of the arms, said contact jaws, when in closed position, forming a true hemisphere and arranged relative one to the other to provide a hemispherical gauge head, a wedge located between said contact jaws, mutually engaging conical surfaces on the jaws and wedge, a rod extending through said handle having one end affixed to said wedge, a manual control adjustably secured to the opposite end of the rod, a nut mounted in said handle in which a portion of said rod is threaded, and a jam nut for retaining said manual control in fixed relation with respect to said rod.

2. In a gauge for measuring bore holes of small diameter, a handle, a pair of contact jaws supported by said handle, said jaws, when in closed position, forming a true hemisphere, a wedge positioned between said jaws for expanding and adjusting said contact jaws, a rod having one end affixed to said wedge, a fingerpiece on the opposite end of said rod, a nut mounted in said handle through which a threaded portion of said rod extends for feeding said rod longitudinally upon rotation of said fingerpiece, means for angularly displacing said fingerpiece with respect to the rod, and means for locking said fingerpiece in a predetermined position, said contact jaws being formed of spherical segment portions arranged to provide a hemispherical gauge head with the plane of the flat side of the hemispherical head normal to the axis of the handle, and being of greater transverse diameter across the flat side of the head than at any other point intermediate the length of the head.

EUGENE J. WITCHGER.

REFERENCES CITED

The following references are of record in the file of this patent:

UNITED STATES PATENTS

| Number | Name | Date |
|---|---|---|
| 953,282 | Nash | Mar. 29, 1910 |
| 1,072,378 | Bauschlicher | Sept. 2, 1913 |
| 1,656,180 | Eisele | Jan. 17, 1928 |
| 1,806,893 | Cunningham | May 26, 1931 |
| 2,478,427 | Schmid | Aug. 9, 1949 |

FOREIGN PATENTS

| Number | Country | Date |
|---|---|---|
| 546,843 | Great Britain | July 31, 1942 |
| 569,225 | Great Britain | May 14, 1945 |

OTHER REFERENCES

Publication, "Popular Science Monthly," June 1930, page 119.